(12) United States Patent
Wang et al.

(10) Patent No.: US 12,553,656 B2
(45) Date of Patent: Feb. 17, 2026

(54) FIXING CLIP AND REFRIGERATOR

(71) Applicants: QINGDAO HAIER REFRIGERATOR CO., LTD., Shandong (CN); HAIER SMART HOME CO., LTD., Shandong (CN)

(72) Inventors: Haijuan Wang, Shandong (CN); Yanbin Wan, Shandong (CN); Wenchao Xue, Shandong (CN); Wenjing Cai, Shandong (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 95 days.

(21) Appl. No.: 18/291,678

(22) PCT Filed: May 12, 2022

(86) PCT No.: PCT/CN2022/092475
§ 371 (c)(1),
(2) Date: Jan. 24, 2024

(87) PCT Pub. No.: WO2023/005345
PCT Pub. Date: Feb. 2, 2023

(65) Prior Publication Data
US 2024/0240847 A1    Jul. 18, 2024

(30) Foreign Application Priority Data
Jul. 26, 2021 (CN) .......................... 202121703371.8

(51) Int. Cl.
*F25D 19/00* (2006.01)
(52) U.S. Cl.
CPC ................................. *F25D 19/00* (2013.01)

(58) Field of Classification Search
CPC ....... F16L 55/0335–0338; F16L 3/1203; F16L 3/1083; F16L 3/13; F16L 55/033–035; F25D 23/067; F25D 2500/13; F25D 19/00
See application file for complete search history.

(56) References Cited

U.S. PATENT DOCUMENTS 2,355,742 A * 8/1944 Morehouse ........... F16L 55/035
248/68.1
5,947,426 A    9/1999 Kraus
(Continued)

FOREIGN PATENT DOCUMENTS

CN      101321998 A * 12/2008 ........... F25D 23/006
CN      102734564 A    10/2012
(Continued)

OTHER PUBLICATIONS

English language translation of DE10-2015210471 to Sainton. Translated Jun. 2025 (Year: 2015).*
(Continued)

*Primary Examiner* — Cassey D Bauer
(74) *Attorney, Agent, or Firm* — MUNCY, GEISSLER, OLDS & LOWE, P.C.

(57) ABSTRACT

A fixing clip, comprising a body portion, and a clamping portion provided with a first clamping section and a second clamping section, which respectively extend forwards from opposite ends of a front side of the body portion, wherein a space for accommodating a pipeline is defined between the first clamping section and the second clamping section; and a flexible member is arranged on an inner side surface of the first clamping section and/or an inner side surface of the second clamping section. Further disclosed is a refrigerator.

(Continued)

The fixing clip and a pipeline of an evaporator are fixed more tightly, such that the evaporator is fixed more stably in a refrigerator body.

8 Claims, 4 Drawing Sheets

(56) References Cited

U.S. PATENT DOCUMENTS

| | | | |
|---|---|---|---|
| 2005/0139732 A1 | | 6/2005 | Kato |
| 2013/0112817 A1 | | 5/2013 | Unger |
| 2013/0221185 A1 | * | 8/2013 | Ogawa ............... F16L 55/035 248/634 |

FOREIGN PATENT DOCUMENTS

| | | | | |
|---|---|---|---|---|
| CN | 103890472 A | | 6/2014 | |
| CN | 204177033 U | | 2/2015 | |
| CN | 206498139 U | | 9/2017 | |
| CN | 206912765 U | | 1/2018 | |
| CN | 208268539 U | | 12/2018 | |
| CN | 210461938 U | | 5/2020 | |
| CN | 216114790 U | | 3/2022 | |
| CN | 216114791 U | | 3/2022 | |
| DE | 102015210471 A1 | * | 12/2015 | ............ F16L 55/035 |
| WO | WO-2005100889 A1 | * | 10/2005 | ............ F25D 23/006 |

OTHER PUBLICATIONS

English language translation of CN101321998 to Spiller. Translated Jun. 2025 (Year: 2008).*

* cited by examiner

FIXING CLIP AND REFRIGERATOR

TECHNICAL FIELD

The present invention relates to the field of refrigeration and freezing devices, and in particular, to a fixing clip and a refrigerator.

BACKGROUND

Existing evaporators in refrigerators are fixed using clamps made of relatively hard material. This results in poor fastening, insufficiently tight fitting between the clamp and the evaporator pipeline, leading to displacement and falling off during transportation and use of the refrigerator.

SUMMARY

An object of the present invention is to provide a fixing clip that securely fixes an evaporator inside a refrigerator.

A further object of the present invention is to prevent the evaporator pipeline from falling out of the fixing clip.

In particular, the present invention is directed to a fixing clip, comprising:
- a body portion; and
- a clamping portion having a first clamping section and a second clamping section, the first clamping section and the second clamping section extending forward from opposite ends of a front side of the body portion; wherein a space to accommodate a pipeline is defined between the first clamping section and the second clamping section, and an inner side surface of the first clamping section and/or the second clamping section is provided with a flexible member.

Further, the first clamping section and the second clamping section extend forward from the upper and lower ends of the front side of the body portion respectively, the first clamping section is bending upwards and the second clamping section is bending downwards, a gap is formed between front ends of the first and second clamping sections, thereby defining the space to accommodate the pipeline.

Further, the inner side of the first clamping section and the inner side of the second clamping section define a plurality of slots respectively, one flexible member is defined in each slot, and an inner surface of the flexible member is protruding beyond the slot.

Further, the hardness of the flexible member is less than the hardness of the clamping portion.

Further, the fixing clip further comprises a shielding part, and the shielding part is formed in front of the clamping portion, for shielding the pipeline after it is inserted into the clamping portion.

Further, the shielding part comprises an upper shielding part and a lower shielding part; the upper shielding part comprises a first section extending forward and upward from the front end of the first clamping section and a second section extending backward and downward from the first section; the lower shielding part comprises a third section extending forward and downward from the front end of the second clamping section and a fourth section extending backward and upward from the third section.

Further, a limiting piece is defined on a rear side of the body portion, the body portion is inserted into an installation opening on an inner liner of the refrigerator until the limiting piece abuts against an outer side of the inner liner.

Further, a handle is defined on a rear side of the limiting piece.

The present invention is further directed to a refrigerator, comprising:
- an inner liner defining a storage chamber;
- an evaporator for providing cooling to the storage chamber; and
- the aforementioned fixing clip, an installation opening is provided on the inner liner, the body portion is inserted into the installation opening so that the clamping portion is inside the inner liner, and the clamping portion is fixed with the pipeline of the evaporator.

Further, the evaporator comprises a plurality of fins and a coiled pipeline bent and passed through the fins, the coiled pipeline is used for circulating refrigerant, and the clamping portion is fixed with the coiled pipeline.

The fixing clip of this invention includes a body portion and a clamping portion, with the clamping portion comprising a first clamping section and a second clamping section. Flexible members are provided on the inner side surface of the first clamping section and/or the second clamping section. These flexible members have relatively better elasticity, ensuring a tighter fixation between the fixing clip and the evaporator pipeline, and more stable fixation of the evaporator inside the cabinet, while also reducing vibration and noise during the operation of the evaporator.

The above and other objects, advantages and features of the present invention will become more apparent to those skilled in the art from the following detailed description of specific embodiments thereof taken in conjunction with the accompanying drawings.

BRIEF DESCRIPTION OF THE DRAWINGS

Some specific embodiments of the invention will be described in detail hereinafter by way of example and not by way of limitation with reference to the accompanying drawings. The same reference numerals identify the same or similar components or parts in the drawings. Those skilled in the art should appreciate that the drawings are not necessarily drawn to scale. In the drawings.

DETAILED DESCRIPTION

Figure 1:
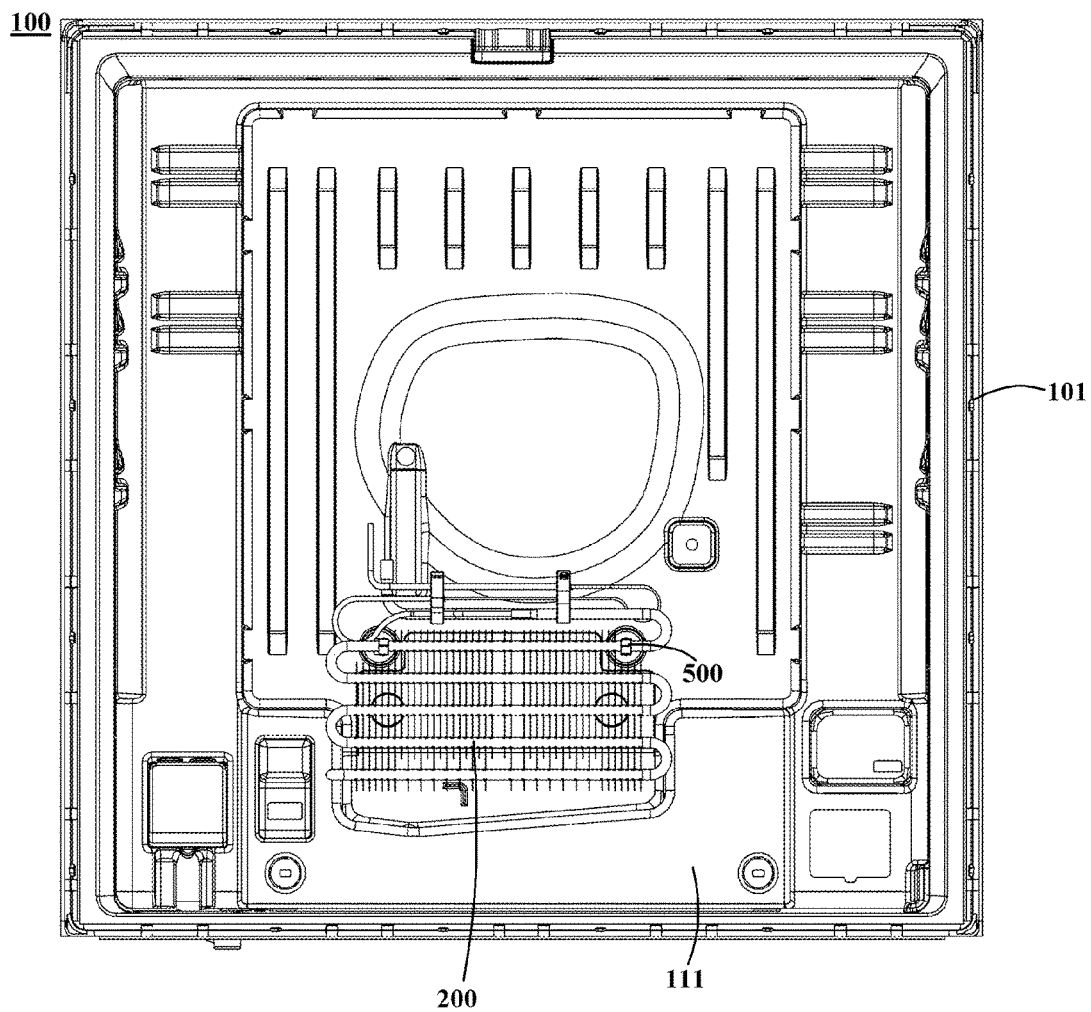
FIG. 1 is a schematic structural diagram of a refrigerator with an evaporator having a fixing clip according to an embodiment of the present invention.
Figure 2:
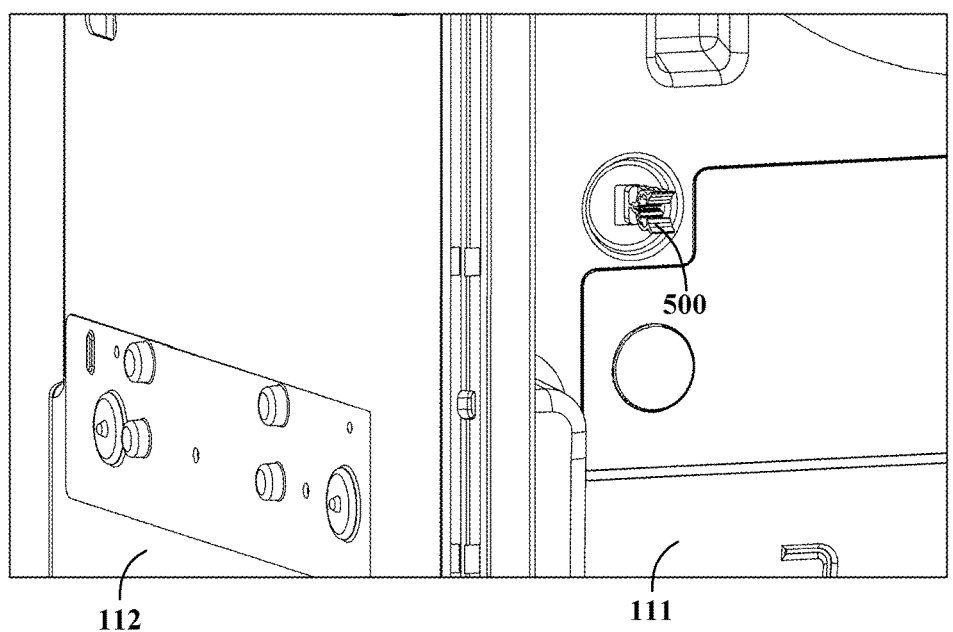
FIG. 2 is an enlarged schematic diagram of the refrigerator shown in FIG. 1 without the evaporator installed.
Figure 3:
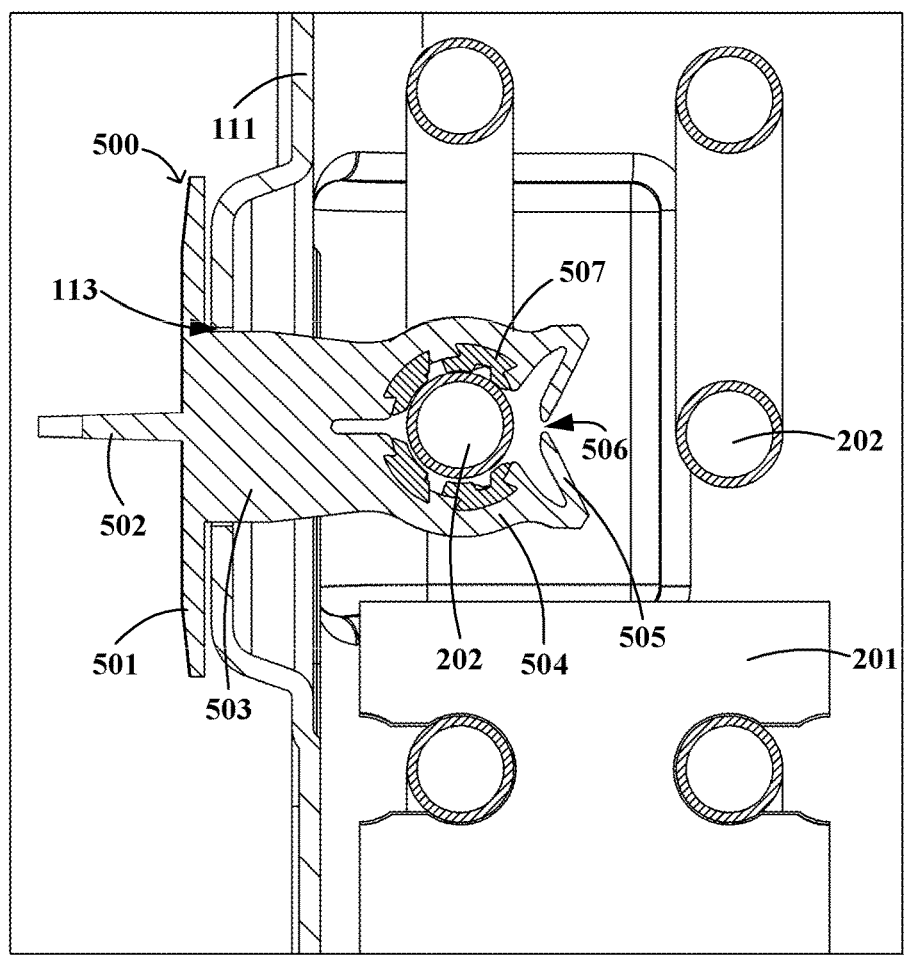
FIG. 3 is a partial sectional schematic diagram of the refrigerator shown in FIG. 1 with the evaporator installed.
Figure 4:
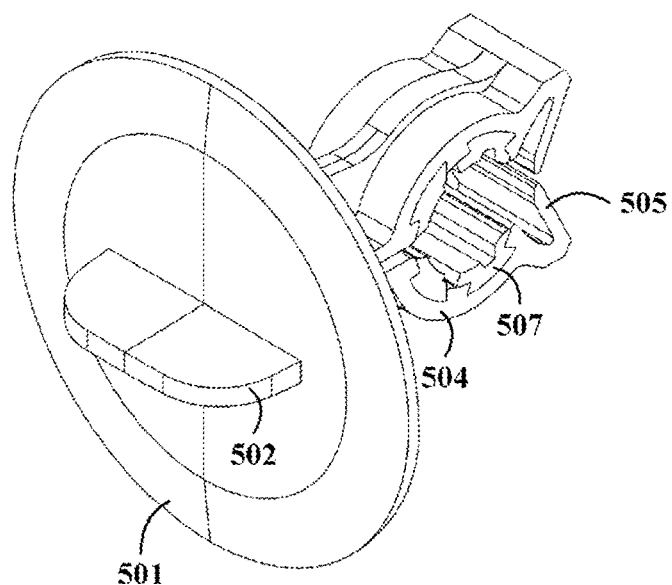
FIG. 4 is a schematic diagram of the structure of the fixing clip.
Figure 5:
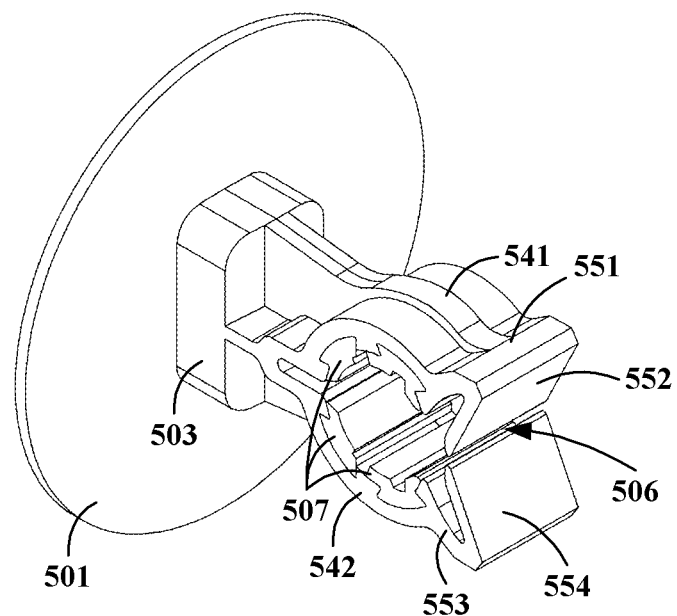
FIG. 5 is another schematic diagram of the structure of the fixing clip.

FIG. 1 is a schematic structural diagram of a refrigerator 100 with an evaporator 200 having a fixing clip 500 according to an embodiment of the invention. FIG. 2 is an enlarged schematic diagram of the refrigerator 100 without the evaporator 200 installed as shown in FIG. 1. FIG. 3 is a partial sectional schematic diagram of the refrigerator 100 with the evaporator 200 installed as shown in FIG. 1. FIG. 4 is a schematic diagram of the structure of the fixing clip 500 as shown in FIG. 1. FIG. 5 is another schematic diagram of the structure of the fixing clip 500 as shown in FIG. 1. The refrigerator 100 in the present embodiment is provided with the fixing clip 500. The fixing clip 500 comprises a body portion 503 and a clamping portion 504, the clamping portion 504 has a first clamping section 541 and a second clamping section 542, the first clamping section 541 and the second clamping section 542 extend forward from opposite ends of a front side of the body portion 503, a space to accommodate a pipeline is defined between the first clamping section 541 and the second clamping section 542, and an inner side surface of the first clamping section 541 and/or the second clamping section 542 is provided with a flexible member 507.

The embodiment of the present invention also provides a refrigerator 100 comprising the evaporator 200 and the fixing clip 500. The refrigerator 100 comprises a cabinet, a door (not shown) and a compression refrigeration system. An inner liner 101 of the cabinet defines a storage chamber. The storage chamber can be divided into different temperature zones like refrigeration, freezing, and variable temperature compartments. The compression refrigeration system comprises a compressor, the evaporator 200, a condenser, and a capillary tube, etc. The evaporator 200 provides cooling to the storage chamber. An installation opening 113 is provided on the inner liner 101, the body portion 503 is inserted into the installation opening 113 so that the clamping portion 504 is inside the inner liner 101, and the clamping portion 504 is fixed with the pipeline of the evaporator 200.

The fixing clip 500 of the evaporator 200 in this embodiment of the present invention has a flexible member 507 on the inner side surface of the first clamping section 541 and/or the second clamping section 542. The resilience of the flexible member 507 is relatively better, thereby ensuring a tighter fixation between the fixing clip 500 and the pipeline of the evaporator 200, and resulting in a more stable fixation of the evaporator 200 inside the cabinet. The use of the fixing clip 500 also reduces vibration and noise during the operation of the evaporator 200.

The structure of the first clamping section 541 and the second clamping section 542 satisfies the requirement to define the space to accommodate the pipeline between them. This can be achieved by bending at least one of the first clamping section 541 and the second clamping section 542 in a direction away from the other. For example, the first clamping section 541 is bending upwards, and the second clamping section 542 is bending downwards; or the first clamping section 541 is approximately horizontal, and the second clamping section 542 bends downwards; or the second clamping section 542 is approximately horizontal, and the first clamping section 541 bends upwards. As shown in FIG. 3, in some embodiments, the first clamping section 541 and the second clamping section 542 each extend forward from the upper and lower ends of the front side of the body portion 503 respectively, with the first clamping section 541 bending upwards and the second clamping section 542 bending downwards. There is a gap between front ends of the first clamping section 541 and the second clamping section 542, thus defining the space to accommodate the pipeline between them. By bending the first clamping section 541 upwards and the second clamping section 542 downwards, it is easier to insert the pipeline between the first clamping section 541 and the second clamping section 542.

Figure 6:
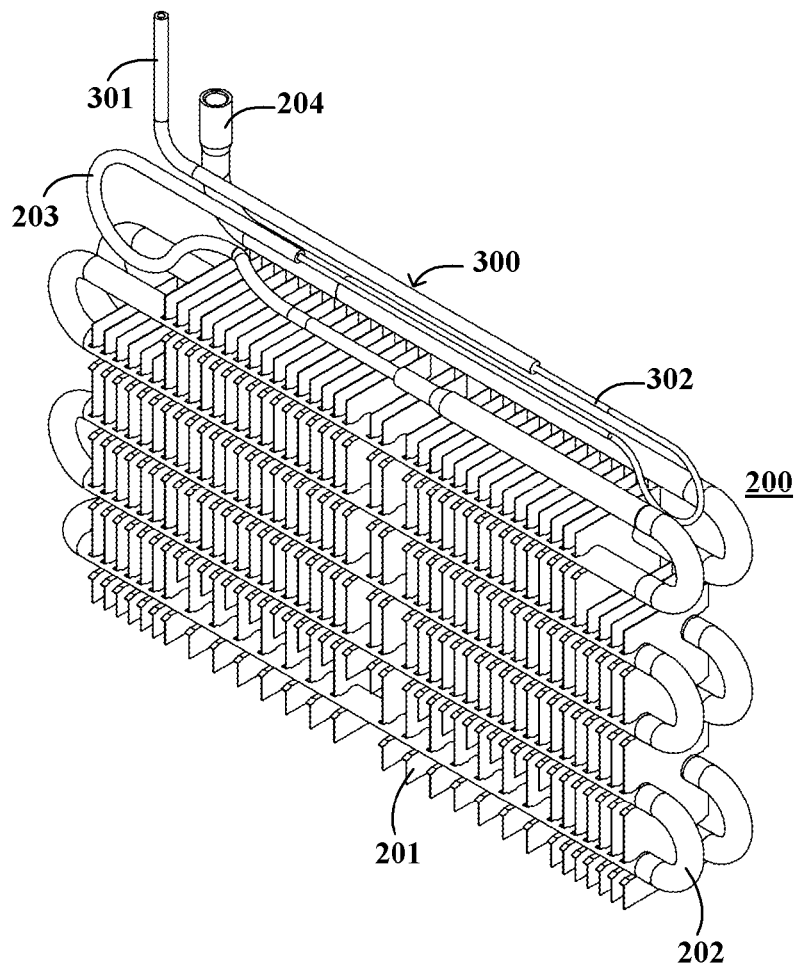
FIG. 6 is a schematic structural diagram of the evaporator shown in FIG. 1.

FIG. 6 is a schematic structural diagram of the evaporator 200 of the refrigerator 100 as shown in FIG. 1. As shown in FIG. 6, the evaporator 200 in the embodiment of the invention comprises a plurality of fins 201 and a coiled pipeline 202 bent and passed through the fins 201, the coiled pipeline 202 has a refrigerant inlet and a refrigerant outlet. The clamping portion 504 is fixed with the coiled pipeline 202 of the evaporator 200. As shown in FIG. 1, the left and right sides of the coiled pipeline 202 on an upper side of the evaporator 200 are respectively provided with one fixing clip 500, and the clamping portion 504 of each fixing clip 500 is fixed with the coiled pipeline 202.

As shown in FIGS. 3 to 5, the inner side surfaces of the first clamping section 541 and the inner side surface of the second clamping section 542 define a plurality of slots (not labeled) respectively, one flexible member 507 is defined in each slot, and an inner surface of the flexible member 507 is protruding beyond the slot. By defining multiple slots on the inner side surface of the first clamping section 541 and the second clamping section 542, the installation of the flexible member 507 is facilitated. The hardness of the flexible member 507 is less than that of the clamping portion 504. For example, the clamping portion 504 is made of ABS material, and the flexible member 507 is made of silicone material. By using a harder material for the clamping portion 504 and a softer material for the flexible member 507, the fixing clip 500 not only has a certain degree of hardness but can also tightly fit and fix the pipeline. The fixing clip 500 can be an integrated structure to facilitate the molding and manufacturing of the fixing clip 500.

In some embodiments, the body portion 503 of the fixing clip 500 further defines a limiting piece 501 at its rear side, and the body portion 503 is inserted into the installation opening 113 until the limiting piece 501 abuts against an outer side of the inner liner 101. The limiting piece 501 ensures that the fixing clip 500 is securely fixed to the inner liner 101, thereby preventing it from falling off. In addition, a handle 502 is formed on a rear side of the limiting piece 501 to facilitate installation by workers. As shown in FIG. 2, the installation opening 113 is provided on a rear wall 111 of the inner liner 101. It can be understood that when installing the evaporator 200 on a side wall 112 of the inner liner 101, an installation opening 113 can be provided on the side wall 112 of the inner liner 101.

In some embodiments, the fixing clip 500 of the invention further comprises a shielding part 505 formed in front of the clamping portion 504, for shielding the pipeline after it is inserted into the clamping portion 504. The shielding part 505 comprises an upper shielding part and a lower shielding part; the upper shielding part comprises a first section 551 extending forward and upward from the front end of the first clamping section 541 and a second section 552 extending backward and downward from the first section 551; the lower shielding part comprises a third section 553 extending forward and downward from the front end of the second clamping section 542 and a fourth section 554 extending backward and upward from the third section 553. There is a gap 506 between the ends of the second section 552 and the fourth section 554. By providing the shielding part 505, it effectively prevents the pipeline of the evaporator 200 from falling out of the fixing clip 500. Additionally, the entire design of the fixing clip 500 is smooth without special protrusions or grooves, ensuring smooth and convenient installation.

Figure 7:
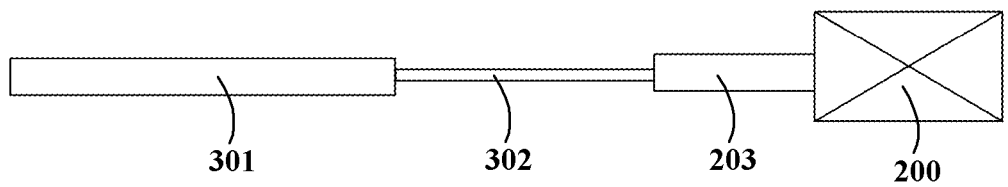
FIG. 7 is a schematic structural diagram of a connecting pipeline and the evaporator as shown in FIG. 6.

As shown in FIGS. 6 and 7, the evaporator 200 in this embodiment further has a connecting pipeline 300, and the connecting pipeline 300 comprises a first pipeline 301, a second pipeline 302, and an inlet pipeline 203 connected in sequence, the inlet pipeline 203 is connected to the refrigerant inlet, and an inner diameter of the first pipeline 301 is larger than that of the second pipeline 302. By arranging the connecting pipeline 300 to include sequentially connected first pipeline 301, second pipeline 302, and inlet pipeline 203, connecting the inlet pipeline 203 to the refrigerant inlet, and making the inner diameter of the first pipeline 301 larger than that of the second pipeline 302, noise can be effectively reduced.

In some embodiments of this invention, a length of the first pipeline 301 of the connecting pipeline 300 is 0.02 m to 1.25 m, preferably 0.02 m to 0.9 m. Experimental tests have shown that when the length of the first pipeline 301 is between 0.02 m and 1.25 m, especially between 0.02 m and 0.9 m, it effectively reduces noise.

An upstream portion of the first pipeline 301 of the connecting pipeline 300 in this embodiment is connected to a capillary tube (not shown); an inner diameter of the first pipeline 301 is 0.5-10 mm, and a wall thickness is 0.2-3 mm. The inner diameter of the first pipeline 301 is larger than that of the capillary tube. If the wall of the first pipeline 301 is too thin, the noise reduction effect is poor, but if the wall is too thick, it increases costs; if the inner diameter of the first pipeline 301 is too small, it might lead to other types of noise issues. Therefore, it is preferable to limit the inner diameter of the first pipeline 301 to 0.5-10 mm and the wall thickness to 0.2-3 mm.

Figure 8:
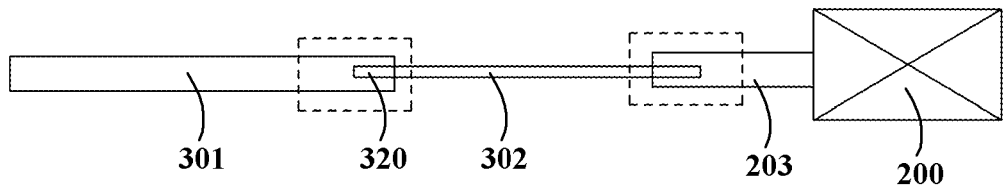
FIG. 8 is another schematic structural diagram of the connecting pipeline and the evaporator as shown in FIG. 6.
Figure 9:
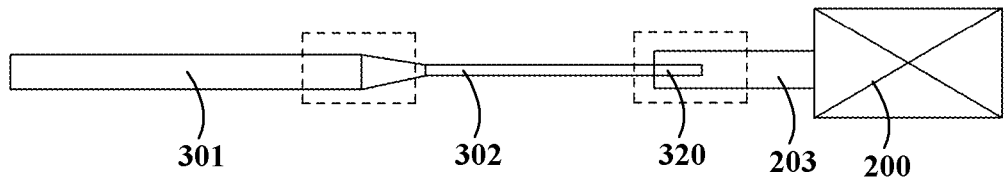
FIG. 9 is another schematic structural diagram of the connecting pipeline and the evaporator as shown in FIG. 6.
Figure 10:
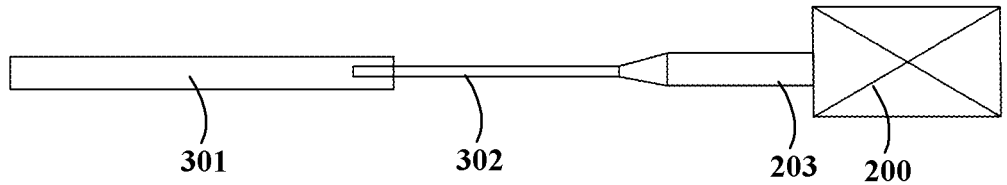
FIG. 10 is another schematic structural diagram of the connecting pipeline and the evaporator as shown in FIG. 6.
Figure 11:
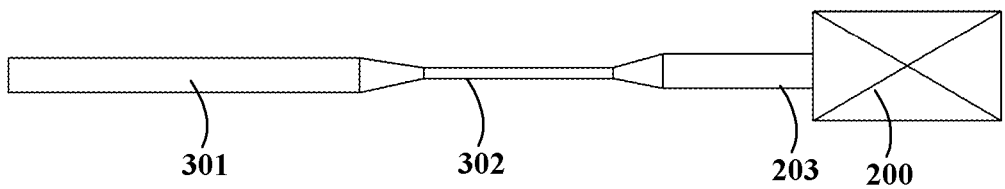
FIG. 11 is another schematic structural diagram of the connecting pipeline and the evaporator as shown in FIG. 6.

In the process of resolving spray noise of the connecting pipeline 300, the fixation technique between the first pipeline 301, the second pipeline 302, and the inlet pipeline 203 of the connecting pipeline in this embodiment is strongly related to the noise reduction effect. If not designed properly, it may lead to low-frequency noise problems. To ensure consistency in the process, the connecting pipeline of this embodiment optimizes the connection manner between every two neighboring pipelines. In some embodiments, the first pipeline 301 is fixed to the second pipeline 302 either by welding or by being integrally drawn; similarly, the second pipeline 302 is fixed to the inlet pipeline 203 either by welding or by being integrally drawn. FIG. 8 illustrates another structural schematic of the connecting pipeline 300 and the evaporator 200 as shown in FIG. 6. In FIG. 8, the second pipeline 302 is welded to both the first pipeline 301 and the inlet pipeline 203. To ensure a certain strength of the welding, an inlet end of the second pipeline 302 is inserted into the first pipeline 301, and an outlet end of the second pipeline 302 is inserted into the inlet pipeline 203. In some embodiments, a length of insertion of the inlet end of the second pipeline 302 into the first pipeline 301 is 10-30 mm; similarly, a length of insertion of the outlet end of the second pipeline 302 into the inlet pipeline 203 is 10-30 mm. An insertion part 320 is marked in FIG. 8. FIG. 9 illustrates another structural schematic of the connecting pipeline and the evaporator 200 as shown in FIG. 6; FIG. 10 is another structural schematic of the connecting pipeline and the evaporator 200 as shown in FIG. 6; FIG. 11 is another structural schematic of the connecting pipeline and the evaporator 200 as shown in FIG. 6. In FIG. 9, the first pipeline 301 is fixed to the second pipeline 302 being integrally drawn, the second pipeline 302 is fixed to the inlet pipeline 203 by welding, the integrally drawing of the second pipeline 302 and the first pipeline 301 can reduce the fluid resistance of the refrigerant in the connection pipeline from coarse to fine, thus reducing the noise. In FIG. 10, the second pipeline 302 is welded to the first pipeline 301, while the second pipeline 302 and the inlet pipeline 203 are integrally drawn. The integral drawing of the second pipeline 302 with the inlet pipeline 203 reduces the fluid resistance when the refrigerant in the connecting pipeline transitions from coarse to fine, thereby reducing noise. In FIG. 11, the second pipeline 302 is integrally drawn with both the first pipeline 301 and the inlet pipeline 203.

In the description of this embodiment, it should be understood that the terms "up," "down," "front," "back," "left," "right," and similar directional or positional terms are based on the orientations or positions shown in the drawings. They are used only to facilitate the description of the invention and to simplify the explanation, rather than to indicate or imply that the apparatus or components must have a specific orientation, be constructed and operated in a specific orientation, and thus should not be construed as limiting the invention.

The terms "first," "second," etc., are used only for descriptive purposes and should not be interpreted as indicating or implying relative importance or implicitly specifying the number of technical features indicated. Therefore, features labeled "first," "second," etc., can explicitly or implicitly include one or more of such features.

It should be noted that if the embodiment of the invention involves directional indications (such as up, down, left, right, front, back), these indications are only used to explain the relative position relationships, motion situations, etc., of the components in a certain posture (as shown in the drawings). If this specific posture changes, then the directional indications will accordingly change.

So far, it should be appreciated by those skilled in the art that while various exemplary embodiments of the invention have been shown and described in detail herein, many other variations or modifications which are consistent with the principles of this invention may be determined or derived directly from the disclosure of the present invention without departing from the spirit and scope of the invention. Accordingly, the scope of the invention should be understood and interpreted to cover all such other variations or modifications.

What is claimed is:

1. A fixing clip, comprising:
   a body portion; and
   a clamping portion having a first clamping section and a second clamping section, the first clamping section and the second clamping section extending forward from opposite ends of a front side of the body portion;
   wherein a space to accommodate a pipeline is defined between the first clamping section and the second clamping section;
   wherein the first clamping section and the second clamping section extend forward from the upper and lower ends of the front side of the body portion respectively, the first clamping section is bending upwards and the second clamping section is bending downwards, a gap is formed between front ends of the first and second clamping sections, thereby defining the space to accommodate the pipeline;
   the inner side surface of the first clamping section and the inner side surface of the second clamping section define a plurality of slots respectively, one flexible member is stuck in each slot, and an inner surface of the flexible member is protruding beyond the slot, two adjacent flexible members stuck in the first clamping section are arranged at intervals along an arc length direction of the first clamping section, and two adjacent flexible members stuck in the second clamping section are arranged at intervals along an arc length direction of the second clamping section.

2. The fixing clip according to claim 1, wherein the hardness of the flexible member is less than the hardness of the clamping portion.

3. The fixing clip according to claim 1, further comprising a shielding part, wherein the shielding part is formed in front of the clamping portion, for shielding the pipeline after it is inserted into the clamping portion.

4. The fixing clip according to claim 3, wherein the shielding part comprises an upper shielding part and a lower shielding part; the upper shielding part comprises a first section extending forward and upward from the front end of the first clamping section and a second section extending backward and downward from the first section; the lower shielding part comprises a third section extending forward and downward from the front end of the second clamping section and a fourth section extending backward and upward from the third section.

5. The fixing clip according to claim 1, wherein a limiting piece is defined on a rear side of the body portion, the body portion is capable of inserting into an installation opening on an inner liner of a refrigerator with the limiting piece abutting against an outer side of the inner liner.

6. The fixing clip according to claim 5, wherein a handle is defined on a rear side of the limiting piece.

7. A refrigerator, comprising:
an inner liner defining a storage chamber;
an evaporator for providing cooling to the storage chamber; and
a fixing clip according to claim 1, wherein an installation opening is provided on the inner liner, the body portion is inserted into the installation opening so that the clamping portion is inside the inner liner, and the clamping portion is fixed with the pipeline of the evaporator.

8. The refrigerator according to claim 7, wherein the evaporator comprises a plurality of fins and the pipeline bent and passed through the fins, the pipeline is used for circulating refrigerant, and the clamping portion is fixed with the pipeline.

\* \* \* \* \*